US007014146B2

(12) United States Patent
Villaume et al.

(10) Patent No.: US 7,014,146 B2
(45) Date of Patent: Mar. 21, 2006

(54) SYSTEM FOR AIDING CONTROL OF THE DECELERATION OF AN AIRCRAFT MOVING OVER THE GROUND

(75) Inventors: Fabrice Villaume, Toulouse (FR); Mikaël Maas, Ramonville Saint Agne (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/884,988

(22) Filed: Jul. 7, 2004

(65) Prior Publication Data

US 2005/0006524 A1 Jan. 13, 2005

(30) Foreign Application Priority Data

Jul. 8, 2003 (FR) .................................. 03 08319

(51) Int. Cl.
*G05D 1/06* (2006.01)

(52) U.S. Cl. ......................... 244/111; 244/183; 701/15; 340/959

(58) Field of Classification Search .............. 244/76 R, 244/111, 183; 701/15, 120, 16, 70; 340/958–959, 340/972; 303/126
See application file for complete search history.

(56) References Cited

U.S. PATENT DOCUMENTS 4,122,522 A * 10/1978 Smith .......................... 701/15
4,454,582 A * 6/1984 Cleary et al. ................. 701/15
5,375,058 A * 12/1994 Bass .......................... 701/120
5,499,025 A * 3/1996 Middleton et al. .......... 340/959
5,519,618 A * 5/1996 Kastner et al. ............. 701/120
5,539,642 A * 7/1996 Wiel ........................... 701/70
5,968,106 A 10/1999 DeVlieg et al.
2004/0026992 A1 2/2004 Villaume

FOREIGN PATENT DOCUMENTS

DE 4009668 10/1991
DE 4304562 8/1994
FR 2817979 6/2002

OTHER PUBLICATIONS

Preliminary Search Report dated Mar. 11, 2003 with English translation.
"System Predicts Critical Runway Performance Parameters," NTIS Tech Notes, US Department of Commerce, Springfield, VA, US, p. 292, XP000227031, ISSN: 0889-8464.

* cited by examiner

*Primary Examiner*—Galen Barefoot
(74) *Attorney, Agent, or Firm*—Stevens, Davis, Miller & Mosher, LLP

(57) ABSTRACT

The system (1) includes braking means (2) for braking the aircraft, a braking unit (3) controlling the braking means (2) on the basis of deceleration orders, a computing unit (5) for computing deceleration orders, which determines a plurality of distance/speed pairs relating to the movement of the aircraft over a landing runway, each of said pairs indicating the speed of movement at the associated distance defined relative to the runway threshold of the landing runway, and an interface element (7) that includes means (14) displaying on a screen (15) a representation (16) of the landing runway, showing the exits, and indications illustrating the distance/speed pairs, aiding an operator in choosing one of the exits, and means (17) enabling an operator to select the chosen exit.

28 Claims, 3 Drawing Sheets

SYSTEM FOR AIDING CONTROL OF THE DECELERATION OF AN AIRCRAFT MOVING OVER THE GROUND

The present invention relates to a system for aiding control of the deceleration of an aircraft, in particular a transport aircraft, moving over the ground.

Generally, an aircraft landing presents three successive phases:

- an approach phase, during which the aircraft approaches the landing runway;
- the landing proper, with the impact of the aircraft on this landing runway; and
- a movement phase, during which the aircraft is braked so as to enable it to take an exit taxiway from the landing runway in order to clear the latter.

It is known that such braking can be performed with the aid of an automatic braking system, making it possible to reduce the pilot's workload and/or to clear the landing runway as quickly as possible.

The applicant's document FR-2 817 979 discloses a method and a device for automatic control of the deceleration of an aircraft in the movement phase on a landing runway.

According to that document, at the moment of impact, i.e. at the moment when the landing gear comes into contact with the landing runway, no movement-phase deceleration reference is applied to the aircraft. The latter therefore covers a first portion of the landing runway at a high speed, at least until a subsequent instant when the deceleration reference is modified. As from that instant, the braking means are actually applied. By thus delaying the instant at which the deceleration reference is modified, it is possible to cover a longer portion of the runway at a higher speed and thus to reduce the runway-occupation time.

Furthermore, document U.S. Pat. No. 5,968,106 discloses an automatic braking system that includes:

- controllable braking means for braking the aircraft when it is moving over the ground;
- a braking unit that automatically controls said braking means on the basis of received deceleration orders; and
- a computing unit for computing, using special formulae, deceleration orders that stop the aircraft at a particular stop position on the runway, particularly at the position of a runway exit taxiway.

This braking system also includes an interface element enabling a crewmember to input data relating to the landing runway into said computing unit, namely essentially said particular stop position.

It will be noted that this interface element is not a genuine (two-way) means of communication between the crew and the braking system since it allows only the inputting of data (a single information travel direction) into the system. The crew therefore has to determine which data necessary to the functioning of said braking system, such as said stop position, are to be input with the aid of other sources of information, which constitutes a significant workload.

An object of the present invention is to remedy these drawbacks. It relates to a system for aiding control of the deceleration of an aircraft moving over the ground and making it possible:

- on the one hand, to obtain particularly effective braking, allowing, in particular, the aircraft rapidly to exit the landing runway; and
- on the other hand, to reduce the workload of the aircraft's pilot or pilots.

To this end, according to the invention, said system of the type including:

- controllable braking means for braking the aircraft when it is moving over the ground;
- a braking unit that automatically controls said braking means on the basis of received deceleration orders;
- a computing unit for computing deceleration orders; and
- an interface element at the disposal of an operator and connected to said computing unit, is noteworthy in that:

- said computing unit determines a plurality of distance/speed pairs relating to the travel of the aircraft over a landing runway used for the landing of said aircraft and comprising a plurality of exits, each of said distance/speed pairs indicating the speed of movement of the aircraft at the associated distance, which is defined relative to the runway threshold, taking into account the point of impact of the aircraft on said landing runway at the time of landing; and
- said interface element includes:
  - display means for displaying, on a display screen, a representation of said landing runway, showing said exits, and indications illustrating said distance/speed pairs, aiding an operator in choosing one of said exits; and
  - selection means enabling an operator to select the chosen exit.

Thus, by virtue of the invention, said system aids an operator, in particular an aircraft pilot, to select the most appropriate exit, particularly that which is most suited to the characteristics of the runway and of the aircraft, which makes it possible to increase the precision of the selection and also to reduce said operator's workload, since the information displayed by said system is directly available to said operator.

Advantageously, said computing unit determines a final speed corresponding to the speed of the aircraft at the exit selected by an operator and a final distance corresponding to the distance between said selected exit and said runway threshold of the landing runway, and wherein:

- during the approach phase before landing, said display means of said interface element display on said display screen indications illustrating said final speed and said final distance; and
- after landing, during movement over the landing runway, said computing unit uses said final speed and said final distance to calculate said deceleration orders.

Thus, the system according to the invention comprises:

- not only an automatic braking function, after landing;
- but also a pilot information function, in particular before landing, that in particular makes it possible to prepare said landing properly.

Furthermore, advantageously, said computing unit determines at least the following distance/speed pairs:

- a speed of movement corresponding to a first predetermined speed and the minimum distance of the runway threshold when the aircraft is moving at this first predetermined speed;
- a speed of movement corresponding to a second predetermined speed and the minimum distance from the runway threshold when the aircraft is moving at this second predetermined speed, if the landing runway is dry; and
- a speed of movement corresponding to the second predetermined speed and the minimum distance from the runway threshold when the aircraft is moving at this second predetermined speed, if the landing runway is wet.

Furthermore, in order to aid the pilot in choosing the exit and to facilitate comprehension of the actual situation (on the landing runway) before and, above all, after landing, advantageously said display means of the interface element show on said representation of the landing runway all the exits located at a distance from said runway threshold that is shorter than the distance of a distance/speed pair having, as speed, a predetermined maximum speed of movement of the aircraft, for example the maximum speed of movement for taking the exit.

Moreover, advantageously, during the approach phase, said computing unit determines a deceleration level that is displayed on said display screen of said interface element.

In a particular embodiment, said computing unit determines a deceleration order and sends it to the braking unit in order automatically to brake the aircraft at an instant corresponding to the first of the following two instants:

the instant at which the aircraft is completely on the ground on the landing runway, upon landing; and the instant of the end of a predetermined timing delay that has elapsed since first contact of the aircraft with the landing runway.

Furthermore, advantageously, during movement over the landing runway, the computing unit determines a first distance/speed pair comprising said final speed and a first distance corresponding to the distance from said runway threshold at said final speed, and said display means of the interface element display on the display screen an indication illustrating this first distance/speed pair.

In this case, preferably, if said first distance extends beyond said selected exit, said system generates an indication illustrating this extension. For example, said display means of the interface element are able to display such an indication on the display screen. Moreover, advantageously, if said extension lasts longer than a predetermined period, said computing unit selects another exit downstream of said exit selected initially.

Furthermore, advantageously, during movement over the landing runway, the computing unit determines a second distance/speed pair comprising a zero speed and a second distance corresponding to the distance from said runway threshold at said zero speed, and said display means of the interface element display on the display screen an indication illustrating this second distance/speed pair.

In this case, preferably, if said second distance extends beyond the end of the landing runway, said display means of the interface element display on the display screen an indication illustrating this extension, and said computing unit determines a new deceleration order for preventing this extension and sends it to the braking unit in order automatically to brake the aircraft. Advantageously, said new deceleration order is such that the braking unit generates emergency braking of the aircraft.

Furthermore, in a preferred embodiment, said interface element is an avionics-type computer of said aircraft that is connected to said computing unit, which is also of avionics type. However, other embodiments are also possible in which said interface element may, for example be a portable computer capable of being connected removably to said computing unit, which is of avionics type.

The figures of the appended drawing will provide a proper understanding of how the invention may be implemented. In those figures, identical references denote similar elements.

Figure 1:
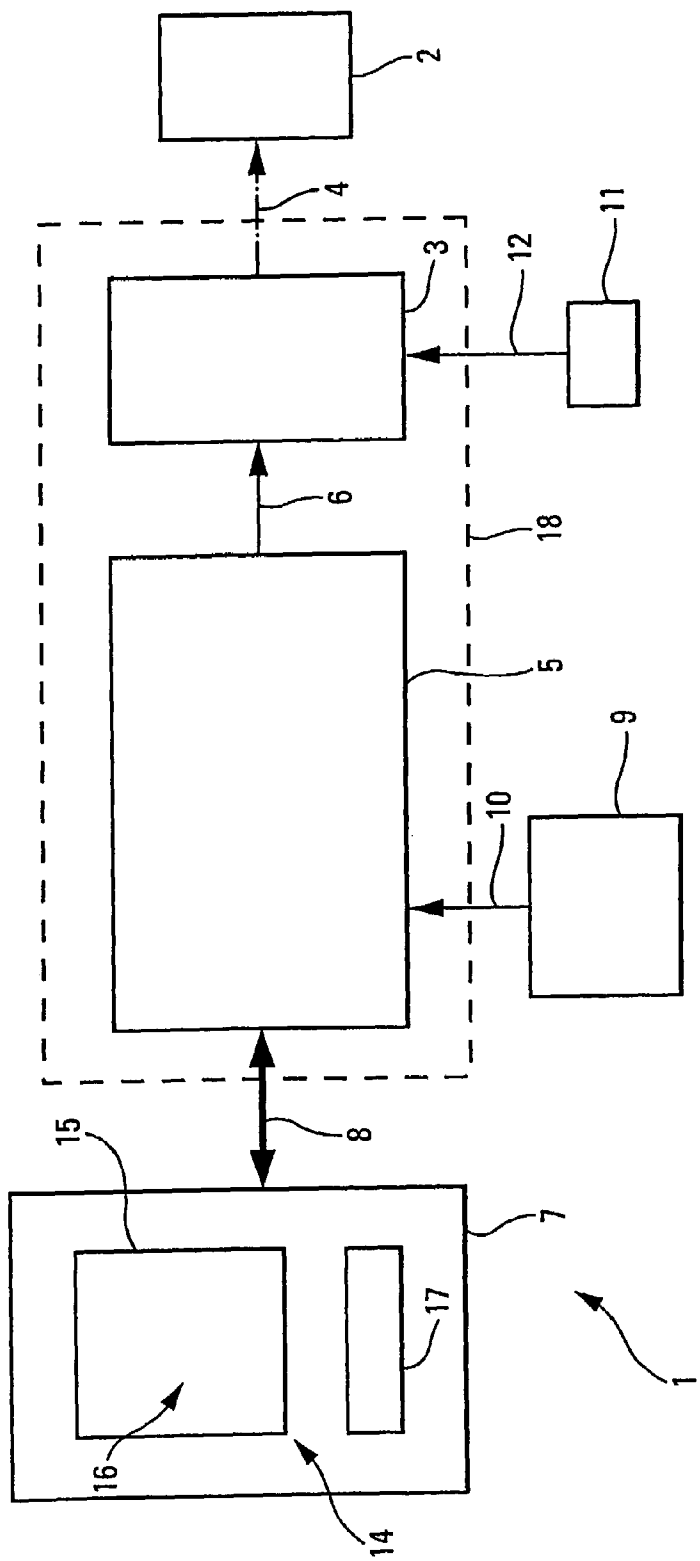
FIG. 1 is the block diagram of a system according to the invention.

The system 1 according to the invention and shown diagrammatically in FIG. 1 is designed to aid control of the deceleration of an aircraft A, in particular a transport aircraft, moving over the ground.

Said system 1 is of the type comprising:

controllable braking means 2 for braking the aircraft A when it is moving over the ground. "Braking means 2 of the aircraft A" is understood to mean any known equipment for decelerating the aircraft A when moving over the ground. These braking means 2 may include disk brakes acting on the landing gear wheels or, optionally, "engine reverse-thrust" devices. The braking means 2 may also include other aerodynamic braking devices such as air brakes or a tail parachute;

a braking unit 3 that automatically controls said braking means 2 on the basis of received deceleration orders, as illustrated by a link 4 in dot-dash lines in FIG. 1;

a computing unit 5 connected to said braking unit 3 by a link 6 for computing deceleration orders; and an interface element 7 at the disposal of an operator and connected to said computing unit 5 by linking means 8.

Said system 1 also includes:

information sources 9, in particular sensors and computers of the aircraft A, which provide information on the status of said aircraft A and on the status of the latter's equipment, and also on the environment, to the computing unit 5 by means of a link 10; and an actuating means 11, for example a rotary button, connected to the braking unit 3 by a link 12 and enabling an operator to turn it on and to turn it off and, optionally, to select a particular deceleration (or braking) level.

According to the invention:

said computing unit 5 determines a plurality of distance/speed pairs C1, C2, C3 relating to the movement of the aircraft A over a landing runway 13 used for the landing of said aircraft A and including a plurality of exits S1, S2, S3, S4. Each of said distance/speed pairs C1, C2, C3 indicates the speed of movement of the aircraft A at the associated distance, which is defined relative to the runway threshold of the landing runway 13, taking into account the point P of impact (corresponding to the centre of the theoretical impact zone of the aircraft A on said landing runway 13 at the time of landing); and said interface element 7 includes:

display means 14 designed to display on a display screen 15 a representation 16 (presented in FIG. 2, for example) of said landing runway 13, further showing said exits S1 to S4, and indications (or indicators) I1, I2, I3 illustrating said distance/speed pairs C1, C2, C3. In particular, this representation 16 aids an operator in choosing from said exits S1 to S4, that which the aircraft A should take in order to leave the landing runway 13; and selection means 17 enabling an operator to select the chosen exit.

In a preferred embodiment, said interface element 7 is an avionics-type computer of said aircraft A, which is connected by customary linking means 8 to said computing unit 5 that forms part, together with the braking unit 3, of an avionics-type assembly 18. However, other embodiments are also possible in which said interface element 7 may, for example, be a portable computer that is of the "open world"

type and capable of being removably connected to said avionics-type computing unit 5. Said selection means 17 may be keyboard keys, a computer-mouse-type designation device or a touch-sensitive screen.

Thus, the system 1 according to the invention aids an operator, in particular an aircraft pilot, in selecting the most appropriate exit, particularly that most suited to the characteristics of the runway 13 and of the aircraft A, which makes it possible to increase the precision of the selection and further to reduce the workload of said operator, since the information displayed by said system 1 is directly available to said operator.

Figure 3:
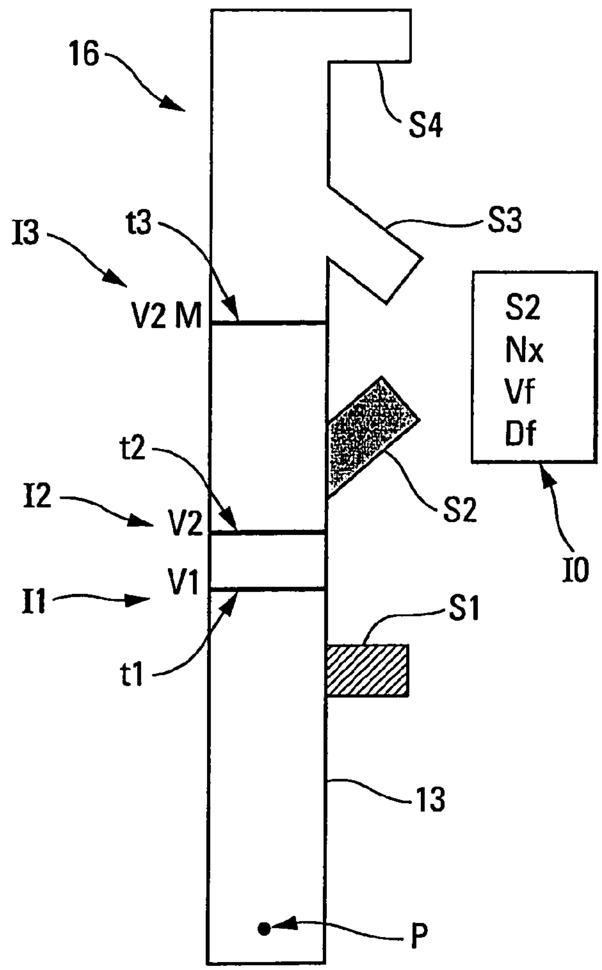

According to the invention, said computing unit 5 determines a final speed Vf corresponding to the speed of the aircraft A at the exit selected by the operator, for example the exit S2, and a final speed Df corresponding to the distance between said selected exit and said runway threshold of the landing runway 13, and:

- during the approach phase before landing, said display means 14 of said interface element 7 display on said display screen 15 an indication IO indicating said final speed Vf and said final distance Df, as shown in FIG. 3; and
- after landing, during movement over the landing runway 13, said computing unit 5 uses said final speed Vf and said final distance Df to compute said deceleration orders with a view to automatic braking of the aircraft A.

Thus, the system 1 according to the invention comprises:

- not only an automatic braking function, after landing;
- but also a pilot information function, before (and after) landing, allowing, in particular, said landing to be properly prepared.

In a preferred embodiment, said computing unit 5 determines at least the following distance/speed pairs:

- a pair C1 (shown by an indication I1 in FIGS. 2 and 3), comprising a speed of movement V1 corresponding to a first predetermined speed, for example 50 knots (approximately 92 km/h), and a distance D1 corresponding to the minimum distance relative to the runway threshold when the aircraft A moves at said speed V1 (at this distance D1);
- a pair C2 (indication I2), comprising a speed of movement V2 corresponding to a second predetermined speed, for example 10 knots (approximately 18 km/h), below the speed of movement V1, and a distance D2 corresponding to the minimum distance from the runway threshold when the aircraft A moves at said speed V2 and the runway 13 is dry; and
- a pair C3 (indication I3), comprising said speed of movement V2 and a distance D3 corresponding to the minimum distance from the runway threshold when the aircraft A is moving at said speed V2 and the runway 13 is wet.

Figure 2:
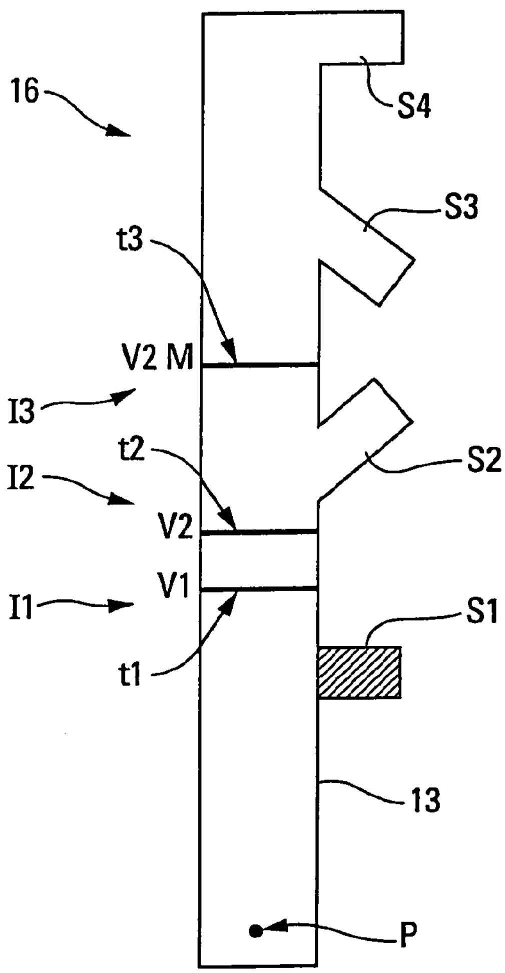
FIGS. 2 to 5 illustrate different representations of the landing runway that may be presented to an operator using display means of a system according to the invention.

As may be seen in FIGS. 2 and 3, each of said indications I1, I2, I3 comprises the corresponding speed of movement V1, V2, V2 and also a line t1, t2, t3 indicating, on the runway 13, the associated distance D1, D2, D3 relative to the runway threshold. The indication I3 also comprises a sign (the letter "M", for example) in order to indicate that it is defined for a wet runway 13.

Furthermore, in order to aid the pilot in choosing the exit and in order to facilitate comprehension of the actual situation (on the landing runway 13) before and, above all, after landing, said display means 14 show on said representation 16 of the landing runway 13 all the exits (for example S1) located at a distance from said runway threshold that is less than the distance (for example D1) of a distance/speed pair (for example C1) having, as speed, a predetermined maximum speed of movement (for example V1) of the aircraft A, for example the maximum speed of movement for taking the exit.

In the example shown in FIGS. 1 and 2, the maximum speed of movement corresponds to the speed V1 (although another speed could also be envisioned), such that only the exit S1 is shown. This is shown by the hatching in FIGS. 2 to 5. This exit S1 cannot thus be taken by the aircraft A, as the latter is unable to brake sufficiently and its speed is therefore too high at said exit S1.

In a particular embodiment, during the approach phase, said computing unit 5 determines a deceleration level Nx, from a plurality of possible deceleration levels, that is displayed on said display screen 15, for example at the indication I0, which also indicates the distance Df, the speed Vf, and the exit (S2, for example) selected by the operator, as shown in FIG. 3. The exit S2 or S4 selected may be shown by a color change (illustrated by a darkening in FIGS. 3 to 5).

Consequently, by virtue of the invention, during the phase of the approach of the aircraft A to the landing runway 13, the following successive stages may, for example, be implemented:

- an aircraft A pilot selects, on the interface element 7, a particular page provided for communication with the computing unit 5;
- the computing unit 5 determines, with the aid of information (such as the airport runway 13 selected for landing, the approach speed of the aircraft A and the theoretical point of impact on said runway 13) emanating from said information sources 9, in particular said abovementioned distances D1, D2, D3, so as to form the pairs C1, C2, C3, and transmits the data relating to these pairs C1, C2, C3 to the interface element 7. The computations may also be performed directly by the interface element 7, which in such a case receives the abovementioned information from said computing unit 5;
- the interface element 7 displays the indications I1, I2, I3 relating to these pairs C1, C2, C3 on the representation 16 (FIG. 2);
- the pilot chooses an exit S2 and selects it with the aid of selection means 17;
- the corresponding information is transmitted to the computing unit 5, which computes the appropriate deceleration orders by determining, in particular, the final distance Df (i.e. the distance between the runway threshold and the selected exit S2) and the final speed Vf;
- the computing unit 5 transmits information (final distance Df, final speed Vf, deceleration level Nx) to the interface element 7, which displays it (indication I0 in FIG. 3).

The system 1 according to the invention thus allows genuine interaction, with two-way communication, between an operator using the interface element 7 and the avionics-type assembly 18. This interaction has an information and landing-preparation function during the approach phase.

After landing, said system 1 allows this interaction to continue and further to generate optimum automatic braking of the aircraft A.

In a particular embodiment, said computing unit 5 determines a deceleration order and sends it to the braking unit 3 in order automatically to brake the aircraft A at an instant corresponding to the first of the following two instants:

the instant at which the aircraft A is completely on the ground upon landing, i.e. the instant at which the front landing gear of the aircraft A touches the landing runway 13 such that the aircraft A then has three points of contact with the ground; and the instant of the end of a predetermined timing delay, for example of two seconds, elapsing from a first contact of the aircraft A, via the main landing gear, for example, with the landing runway 13.

This deceleration order is computed on the basis of the actual position, speed and acceleration of the aircraft A that are detected by customary means forming part of the information sources 9, and on the basis of said previously determined final position and final speed.

Figure 4:
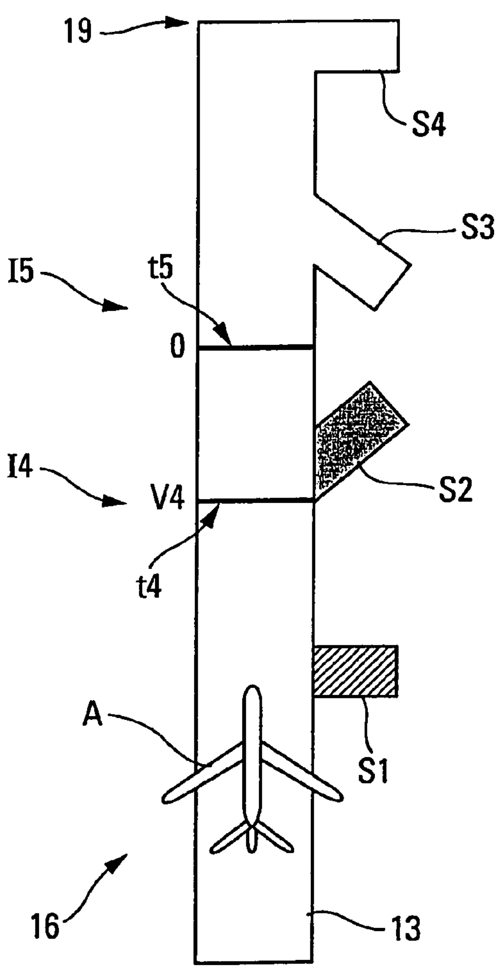

Furthermore, in this case, during movement over the landing runway 13, the computing unit 5 permanently determines a distance/speed pair C4 comprising, as speed V4, said final speed Vf, and a distance D4 corresponding to the distance from said runway threshold at said final speed Vf, and said display means 14 of the interface element 7 display on the display screen 15 an indication I4 (V4 and t4) illustrating this distance/speed pair C4, as shown in FIG. 4.

Figure 5:
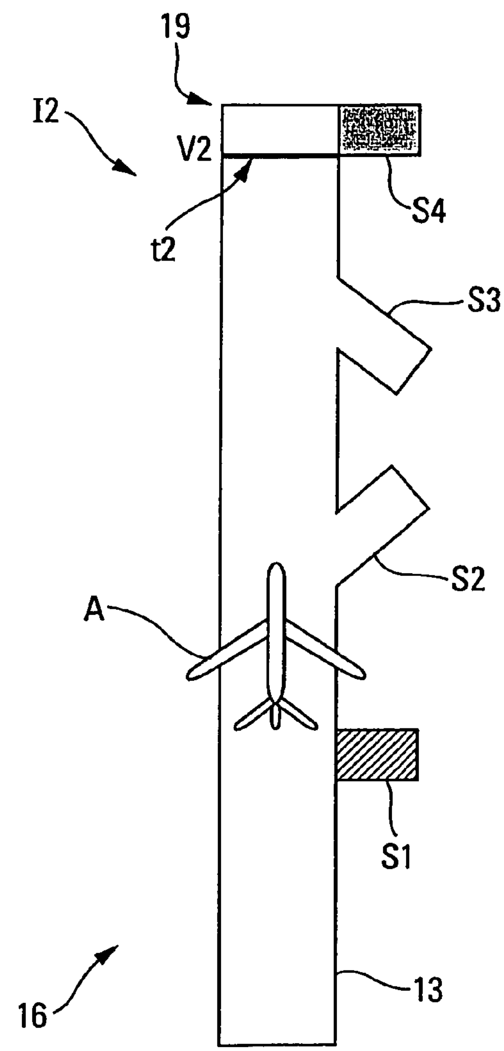

FIGS. 4 and 5 also show a symbol A illustrating the effective actual position of the aircraft on the landing runway 13 during the movement phase.

If said distance D4 extends beyond said selected exit S2, said display means 14 of the interface element 7 display on the display screen 15 an indication I4A illustrating this extension. By way of example, this indication I4A may correspond to a color change in the indication I4, or at least in the line t4 of this indication I4, which changes from a black color to an amber color, for example.

If said extension lasts for longer than a predetermined period, the computing unit 5 selects another exit S4, downstream of said initially selected exit S2, in the direction of movement of the aircraft A, as shown in FIG. 5.

Furthermore, during the movement of the aircraft A over the landing runway 13, the computing unit 5 determines in addition a distance/speed pair C5 comprising a zero speed "0" and a distance D5 corresponding to the distance from said runway threshold at said zero speed, and said display means 14 display on the display screen 15 an indication I5 ("0" and t5) illustrating this distance/speed pair C5, as shown in FIG. 4.

If said distance D5 extends beyond the end 19 of the landing runway 13, said display means 14 display on the display screen 15 an indication illustrating this extension. Moreover, said computing unit 5 determines a new deceleration order designed to prevent this extension and sends it to the braking unit 3 in order automatically to brake the aircraft A so as to keep it on the landing runway 13. Preferably, said new deceleration order is such that the braking unit 3 generates emergency braking of the aircraft A.

By way of example, FIG. 5 shows the indication I2 corresponding to the pair C2, i.e. with the speed V2 as selected speed, which is below the speed V4 or the speed V1. In this case, the indication I2A illustrating an extension beyond the end 19 of the runway 13 may correspond to a color change in this indication I2, or at least in the line t2 of this indication I2, which changes from a black color to a red color, for example. Said extension may also be signaled by a sound or voice indication, which may also be provided to supplement said color change.

The invention claimed is:

1. A system for aiding control of the deceleration of an aircraft moving over the ground, said system including:

controllable braking means for braking the aircraft when it is moving over the ground;

a braking unit that automatically controls said braking means on the basis of received deceleration orders;

a computing unit for computing deceleration orders; and an interface element at the disposal of an operator and connected to said computing unit, wherein:

said computing unit determines a plurality of distance/speed pairs relating to the travel of the aircraft over a landing runway used for the landing of said aircraft and comprising a plurality of exits, each of said distance/speed pairs indicating the speed of movement of the aircraft at the associated distance, which is defined relative to the runway threshold, taking into account the point of impact of the aircraft on said landing runway at the time of landing; and said interface element includes:

display means for displaying, on a display screen, a representation of said landing runway, showing said exits, and indications illustrating said distance/speed pairs, aiding an operator in choosing one of said exits; and selection means enabling an operator to select the chosen exit.

2. The system as claimed in claim 1, wherein said computing unit determines a final speed corresponding to the speed of the aircraft at the exit selected by an operator and a final distance corresponding to the distance between said selected exit and said runway threshold of the landing runway, and wherein:

during the approach phase before landing, said display means of said interface element display on said display screen indications illustrating said final speed and said final distance; and after landing, during movement over the landing runway, said computing unit uses said final speed and said final distance to calculate said deceleration orders.

3. The system as claimed in claim 1, wherein said computing unit determines at least the following distance/speed pairs:

a speed of movement corresponding to a first predetermined speed and the minimum distance of the runway threshold when the aircraft is moving at this first predetermined speed;

a speed of movement corresponding to a second predetermined speed and the minimum distance from the runway threshold when the aircraft is moving at this second predetermined speed, if the landing runway; and a speed of movement corresponding to said second predetermined speed and the minimum distance from the runway threshold when the aircraft is moving at this second predetermined speed, if the landing runway is wet.

4. The system as claimed in claim 1, wherein said display means of the interface element show on said representation of the landing runway all the exits located at a distance from said runway threshold that is shorter than the distance of a distance/speed pair having, as speed, a predetermined maximum speed of movement of the aircraft.

5. The system as claimed in claim 1, wherein, during the approach phase, said computing unit determines a deceleration level that is displayed on said display screen of said interface element.

6. The system as claimed in claim 1, wherein said computing unit determines a deceleration order and sends it to the braking unit in order automatically to brake the aircraft at an instant corresponding to the first of the following two instants:

the instant at which the aircraft is completely on the landing runway, upon landing; and the instant of the end of a predetermined timing delay that has elapsed since a first contact of the aircraft with the landing runway.

7. The system as claimed in claim 2, wherein, during movement over the landing runway, the computing unit determines a first distance/speed pair comprising said final speed and a first distance corresponding to the distance from said runway threshold at said final speed, and said display means of the interface element display on the display screen an indication illustrating this first distance/speed pair.

8. The system as claimed in claim 7, wherein, if said first distance extends beyond said selected exit, said system generates an indication illustrating this extension.

9. The system as claimed in claim 8, wherein, if said extension lasts longer than a predetermined period, said computing unit selects another exit downstream of said exit selected initially.

10. The system as claimed in claim 2, wherein, during movement over the landing runway, the computing unit determines a second distance/speed pair comprising a zero speed and a second distance corresponding to the distance from said runway threshold at said zero speed, and said display means of the interface element display on the display screen an indication illustrating this second distance/speed pair.

11. The system as claimed in claim 9, wherein, if said second distance extends beyond the end of the landing runway, said display means of the interface element display on the display screen an indication illustrating this extension, and said computing unit determines a new deceleration order for preventing this extension and sends it to the braking unit in order automatically to brake the aircraft.

12. The system as claimed in claim 11, wherein said new deceleration order is such that the braking unit generates an emergency braking of the aircraft.

13. The system as claimed in any one of the preceding claims, wherein said interface element is an avionics-type computer of said aircraft that is connected to said computing unit, which is also of avionics type.

14. An aircraft, which includes a system such as that specified in claim 1.

15. A system for aiding control of the deceleration of an aircraft moving over the ground, the system comprising:

a controllable braking device that brakes the aircraft when it is moving over the ground;

a braking control unit that automatically controls the braking device on the basis of received deceleration orders;

a computing unit that computes deceleration orders; and an interface element at the disposal of an operator and connected to the computing unit, wherein:

the computing unit determines a plurality of distance/speed pairs relating to the travel of the aircraft over a landing runway used for the landing of the aircraft and comprising a plurality of exits, each of the distance/speed pairs indicating the speed of movement of the aircraft at the associated distance, which is defined relative to the runway threshold, taking into account the point of impact of the aircraft on the landing runway at the time of landing; and the interface element includes:

a display device that displays, on a display screen, a representation of the landing runway, showing the exits, and indications illustrating the distance/speed pairs, aiding an operator in choosing one of the exits; and a selection device enabling an operator to select the chosen exit.

16. The system as claimed in claim 15, wherein the computing unit determines a final speed corresponding to the speed of the aircraft at the exit selected by an operator and a final distance corresponding to the distance between the selected exit and the runway threshold of the landing runway, and wherein:

during the approach phase before landing, the display device of the interface element displays on the display screen indications illustrating the final speed and the final distance; and after landing, during movement over the landing runway, the computing unit uses the final speed and the final distance to calculate the deceleration orders.

17. The system as claimed in claim 15, wherein the computing unit determines at least the following distance/speed pairs:

a speed of movement corresponding to a first predetermined speed and the minimum distance of the runway threshold when the aircraft is moving at this first predetermined speed;

a speed of movement corresponding to a second predetermined speed and the minimum distance from the runway threshold when the aircraft is moving at this second predetermined speed, if the landing runway is dry; and a speed of movement corresponding to the second predetermined speed and the minimum distance from the runway threshold when the aircraft is moving at this second predetermined speed, if the landing runway is wet.

18. The system as claimed in claim 15, wherein the display device of the interface element shows on the representation of the landing runway all the exits located at a distance from the runway threshold that is shorter than the distance of a distance/speed pair having, as speed, a predetermined maximum speed of movement of the aircraft.

19. The system as claimed in claim 15, wherein, during the approach phase, the computing unit determines a deceleration level that is displayed on the display screen of the interface element.

20. The system as claimed in claim 15, wherein the computing unit determines a deceleration order and sends it to the braking unit in order automatically to brake the aircraft at an instant corresponding to the first-to-occur of the following two instants:

the instant at which the aircraft is completely on the landing runway, upon landing; and the instant at the end of a predetermined timing delay that has elapsed since a first contact of the aircraft with the landing runway.

21. The system as claimed in claim 16, wherein, during movement over the landing runway, the computing unit determines a first distance/speed pair comprising the final speed and a first distance corresponding to the distance from the runway threshold at the final speed and the display device of the interface element displays on the display screen an indication illustrating this first distance/speed pair.

22. The system as claimed in claim 21, wherein, if the first distance extends beyond the selected exit, the system generates an indication illustrating this extension.

23. The system as claimed in claim 22, wherein, if the indication of the extension lasts longer than a predetermined period, the computing unit selects another exit downstream of the exit selected initially.

24. The system as claimed in claim 16, wherein, during movement over the landing runway, the computing unit determines a second distance/speed pair comprising a zero speed and a second distance corresponding to the distance from the runway threshold at the zero speed and the display device of the interface element displays on the display screen an indication illustrating this second distance/speed pair.

25. The system as claimed in claim 23, wherein, if the second distance extends beyond the end of the landing runway, the display device of the interface element displays on the display screen an indication illustrating this extension and the computing unit determines a new deceleration order for preventing this extension and sends it to the braking unit to automatically brake the aircraft.

26. The system as claimed in claim 25, wherein the new deceleration order is such that the braking unit generates an emergency braking of the aircraft.

27. The system as claimed in claim 15, wherein the interface element is an avionics-type computer of the aircraft that is connected to the computing unit, which is also of an avionics type.

28. An aircraft, which includes a system such as that specified in claim 15.

* * * * *